G. THOMAS.
GRADING OR SORTING MACHINE.
APPLICATION FILED JUNE 22, 1910.
981,955.
Patented Jan. 17, 1911.
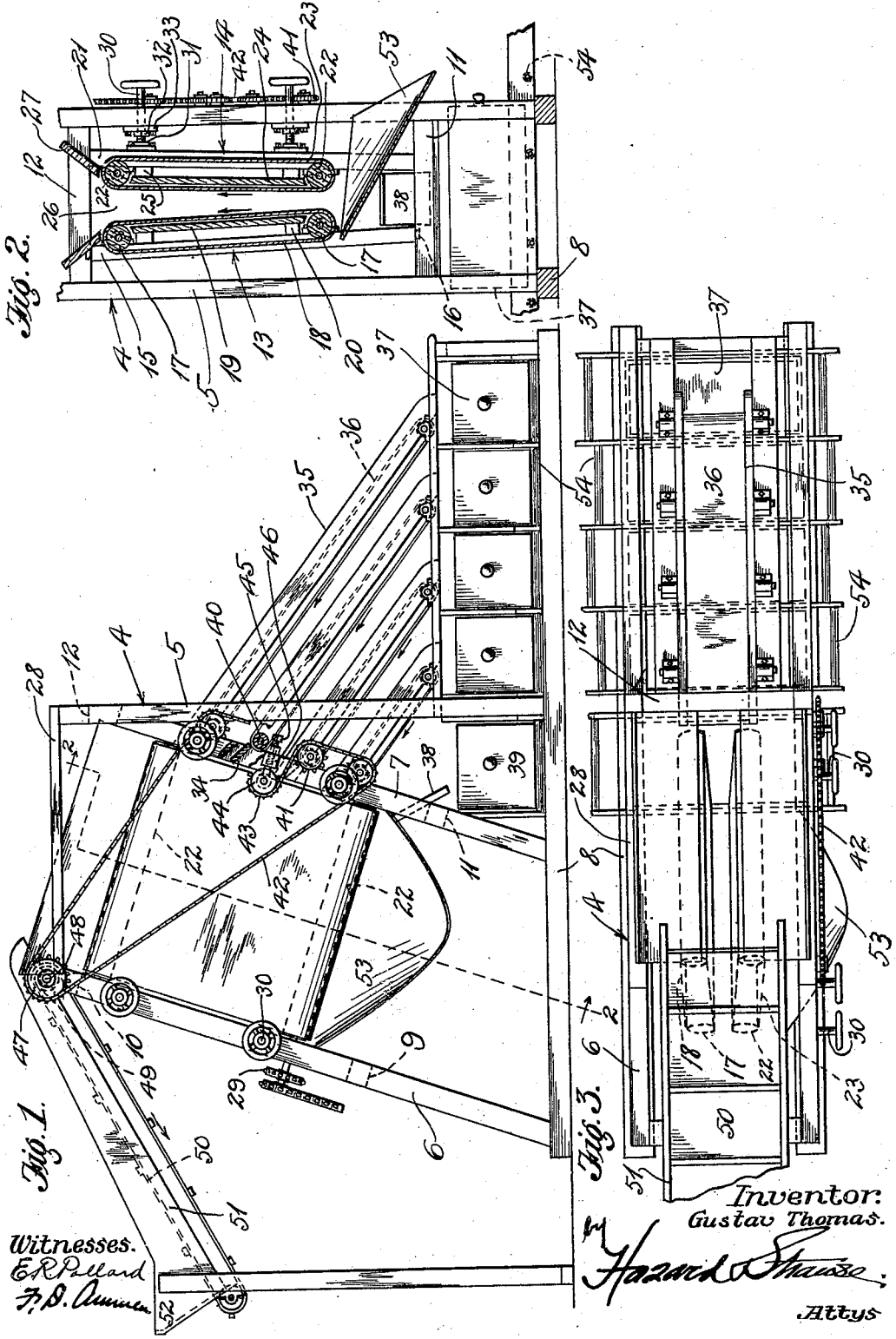
Inventor:
Gustav Thomas.

UNITED STATES PATENT OFFICE.

GUSTAV THOMAS, OF LOS ANGELES, CALIFORNIA.

GRADING OR SORTING MACHINE.

981,955. Specification of Letters Patent. Patented Jan. 17, 1911.

Application filed June 22, 1910. Serial No. 568,298.

*To all whom it may concern:*

Be it known that I, GUSTAV THOMAS, a citizen of the United States, residing at Los Angeles, in the county of Los Angeles and State of California, have invented new and useful Improvements in Grading or Sorting Machines, of which the following is a specification.

This invention relates to grading or sorting machines, the purpose of which is to grade or sort vegetables, fruits, olives, nuts, stone, or any other articles.

The object of the invention is to produce a device of this kind which will operate effectively upon a quantity of vegetables or fruit, composed of units of different size, so as to segregate the same according to the different sizes.

A special object of the invention is to provide an arrangement which will operate without any danger of crushing or injuring the product upon which it operates.

In the drawing forming a part of the annexed specification, Figure 1 is a side elevation of a machine constructed according to my invention. Fig. 2 is a section taken about on the line 2—2 of Fig. 1 and illustrating the inner construction of the device. Fig. 3 is a plan of the machine.

Referring more particularly to the parts 4 represents the frame of the machine which comprises a pair of uprights or posts 5 near which inclined standards 6 and 7 are arranged in pairs, all of said members 5, 6 and 7 being stepped in suitable sills 8. Between the inclined standards 6—6 horizontal cross bars 9 and 10 are arranged, the cross bar 9 being disposed at a low level and the cross bar 10 at a high level.

Between the inclined bars 7, cross bars 11 and 12 are provided, cross bar 11 being disposed at a low level and cross bar 12 at a high level. In the space surrounded by the bars 6—6 and 7—7 a pair of grader frames 13 and 14 are provided. The grader frame 13 is disposed toward the left as viewed in Fig. 2 and this frame is fixed. In its construction it comprises a pair of fixed inclined bars 15, which are disposed nearly in a vertical position but slightly inclined as shown. The ends of these inclined bars 15 are connected by tenons 16 with the bars 11 and 12. On the inclined bars 15 guide rollers 17 are provided and around these guide rollers an endless belt or apron 18 passes. This belt or apron is of sufficient width to fill the space between the inclined bars 6 and 7. Adjacent to the inner edge of the apron a backing plate 19 is provided which is attached by blocks 20 to the inner side of the inclined bars 15.

The grader frame 14 is movable so as to approach or recede from the frame 13. This frame is formed of slightly inclined bars 21 which are similar to the bars 15 and the ends of these bars 21 slide along the adjacent faces of the bars 11 and 12. These inclined bars 21 support guide rollers 22 similar to the guide rollers 17 and around these guide rollers an endless belt or apron 23 passes as shown. This frame 14 is also provided with a backing plate 24 which is attached to the bars 21 by suitable blocks 25 as indicated.

As shown most clearly in Fig. 2 the aprons 18 and 23 converge in a downward direction and they are disposed slightly apart so as to form a gap receiver space 26 which has its greatest width above and its narrowest width below. Over this sorting receiver 26 inclined boards 27 are provided which form a rudimentary hopper into which the articles to be sorted can be dumped.

As shown in Fig. 1 the upper ends of the inclined bars 6—6 are connected by horizontal braces 28 with the uprights or standards 5. Suitable means indicated at 29 is provided for driving the aprons continuously in the direction of the arrows shown in Fig. 2, in other words the aprons are driven so that their inner runs move in an upward direction and toward the widest point of the receiver.

The grader frame 14 is adapted to be adjusted by means of adjusting screws 30 which pass through the bars 6 and 7 on one side of the machine and the inner ends of these adjusting screws are connected with swivel plates 31 attached to the bars 21. Check nuts 32 are provided for holding the adjusting screws fixed and these check nuts 32 seat against blocks 33 on the inner faces of the bars 6 and 7 as shown in Fig. 2.

As indicated in Fig. 1 the rollers 17 and 22 which support the aprons are inclined so that material fed into the upper end of the receiver 26 tends to gravitate toward the right end of the machine as viewed in Fig. 1.

Between the bars 7 at the right of the machine and at different levels with respect to the receiver 26 I provide shelves or bridges 34 and adjacent to the lower edges of these bridges 34 inclined chutes 35 are provided, each chute being provided with an endless belt 36 the upper run of which travels in a downward direction. The lower ends of these chutes 35 are supported over a plurality of drawers or bins 37, which can be pulled out laterally so as to remove the articles which are delivered to them. Near the lower end of the receiver 26 a special guide board or bridge 38 is provided which is adapted to guide the smallest grade of articles into a special drawer 39 as shown. The upper ends of the belts 36 pass around rollers 40 and the spindles on these rollers are provided with sprocket wheels 41 about which pass an endless chain 42. This chain is drawn laterally at a suitable point to form a loop 43 passing around a tension wheel 44 which tension wheel is adjustably mounted by means of an adjusting screw 45 passing through a block 46 secured on the outer side of one of the inclined bars 7. By adjusting this tension wheel 44 the slack of this chain 42 can be taken up when desired. The upper portion of the chain 42 passes around a sprocket wheel 47 which is rigid with the spindle 48 of a feed roller 49 over which runs the upper end of a feed belt or conveyer 50 which is mounted in feed chute 51. The lower end of the feed chute 51 being formed into a feed hopper 52, into which the articles to be graded are fed.

Under the aprons 18 and 23 a curved or dished guide plate 53 is provided which is adapted to receive the smallest articles or culls, and these are delivered laterally at one side of the machine as indicated in Fig. 2. In order to facilitate the removal and replacement of the bins 37 I provide rollers 54 upon which the drawers rest as indicated.

Special attention is called to the direction of movement of the adjacent runs of the aprons 18 and 23; and the fact that these parts of the belt move upwardly tends to prevent the articles or vegetables which are being graded from becoming jammed or clogged in the receiver. In this way the efficiency of the device is increased and there is no danger of crushing vegetables or fruit when being graded. It should be understood that the rollers 17 and 22 are parallel with each other as indicated in Fig. 3.

What I claim is:—

1. A grading machine having a frame, a pair of aprons supported in said frame converging in a downward direction, and disposed apart so as to form a receiving space therebetween, means for driving said aprons so that the adjacent sides thereof move upwardly, and means for receiving articles from between said aprons at different levels.

2. A grading machine comprising a frame, a pair of endless aprons mounted in said frame disposed apart and converging in a downward direction, means for driving said aprons so that their adjacent faces move upwardly, said aprons being tilted so that the articles being graded tend to gravitate toward the depressed end of said aprons, and members disposed at different levels adjacent to the depressed end of said aprons for separating the articles coming from between said aprons.

3. A grading machine comprising a frame, a pair of rollers mounted on said frame, said rollers being parallel with each other, depressed at one end and elevated at the other end, a second pair of rollers opposite said first pair of rollers depressed at one end and elevated at the other end, aprons passing around said rollers, said rollers being arranged so that said aprons converge in a downward direction, means for driving said aprons so that the adjacent runs thereof move upwardly, and means at different levels for receiving the articles from the space between said aprons.

4. A grading machine having a main frame, a fixed grading frame supported in said main frame, rollers mounted in said fixed grading frame, an apron passing around said rollers, a movable grading frame mounted in said main frame, rollers mounted in said movable grading frame, an apron passing around said last rollers, said rollers being arranged so that said aprons converge in a downward direction, backing plates mounted on said fixed frame and said movable frame adjacent to the inner runs of said aprons, means for adjusting said movable grading frame inwardly, means for driving said aprons so that the adjacent runs thereof move upwardly, and means at different levels for receiving the articles from the space between said aprons.

In witness that I claim the foregoing I have hereunto subscribed my name this 17th day of June, 1910.

GUSTAV THOMAS.

Witnesses:
F. D. AMMEN,
EDMUND A. STRAUSE.